United States Patent
Sharma et al.

(10) Patent No.: US 9,626,304 B2
(45) Date of Patent: Apr. 18, 2017

(54) STORAGE MODULE, HOST, AND METHOD FOR SECURING DATA WITH APPLICATION INFORMATION

(71) Applicant: SanDisk Technologies Inc., Plano, TX (US)

(72) Inventors: Aditya Pratap Sharma, Bangalore (IN); Balasiva Narala, Andhra Pradesh (IN)

(73) Assignee: SanDisk Technologies LLC, Plano, TX (US)

( * ) Notice: Subject to any disclaimer, the term of this patent is extended or adjusted under 35 U.S.C. 154(b) by 296 days.

(21) Appl. No.: 14/560,670

(22) Filed: Dec. 4, 2014

(65) Prior Publication Data

US 2016/0110297 A1  Apr. 21, 2016

(30) Foreign Application Priority Data

Oct. 21, 2014 (IN) .......................... 5266/CHE/2014

(51) Int. Cl.
- *G06F 12/14* (2006.01)
- *G06F 21/79* (2013.01)
- *G06F 21/44* (2013.01)

(52) U.S. Cl.
CPC ...... *G06F 12/1458* (2013.01); *G06F 12/1408* (2013.01); *G06F 21/44* (2013.01); *G06F 21/79* (2013.01); *G06F 2212/1052* (2013.01)

(58) Field of Classification Search
CPC ...... G06F 12/1458; G06F 21/79; G06F 21/44; G06F 12/1408; G06F 2212/1052
See application file for complete search history.

(56) References Cited

U.S. PATENT DOCUMENTS

| 6,075,862 A * | 6/2000 | Yoshida ............... G06F 21/121 380/277 |
| 2002/0176575 A1* | 11/2002 | Qawami ............... G06F 21/10 380/201 |
| 2003/0037237 A1* | 2/2003 | Abgrall ................ G06F 21/53 713/166 |
| 2004/0010701 A1* | 1/2004 | Umebayashi ....... G06F 21/6227 713/193 |
| 2004/0025035 A1* | 2/2004 | Jean-Claude ........ G06K 7/0008 713/189 |
| 2004/0193739 A1* | 9/2004 | Shimizu .................. G06F 21/78 710/1 |
| 2005/0278543 A1* | 12/2005 | Tsuda ................. G06F 21/6281 713/182 |
| 2006/0174334 A1* | 8/2006 | Perlin ................. G06F 21/6218 726/9 |
| 2008/0010685 A1* | 1/2008 | Holtzman ........... G06F 12/1483 726/27 |

(Continued)

*Primary Examiner* — Darren B Schwartz
(74) *Attorney, Agent, or Firm* — Brinks Gilson & Lione

(57) ABSTRACT

A storage module, host, and method for securing data with application information are disclosed. In one embodiment, a storage module is provided comprising a memory and a controller. The controller is configured to store data and information about an application that generated the data and allow the data to be read only if information about an application attempting to read the data matches the information about the application that generated the data. Other embodiments are possible, and each of the embodiments can be used alone or together in combination.

28 Claims, 7 Drawing Sheets

(56) References Cited

U.S. PATENT DOCUMENTS

| | | | |
|---|---|---|---|
| 2008/0086614 A1* | 4/2008 | Canis | G06F 21/121 |
| | | | 711/163 |
| 2010/0186068 A1* | 7/2010 | Okuyama | G06F 21/554 |
| | | | 726/4 |
| 2011/0314534 A1* | 12/2011 | James | G06F 21/53 |
| | | | 726/9 |
| 2012/0221725 A1* | 8/2012 | Schroeder, Jr. | G06F 9/468 |
| | | | 709/225 |
| 2012/0284702 A1* | 11/2012 | Ganapathy | G06F 9/468 |
| | | | 717/174 |
| 2014/0258734 A1* | 9/2014 | Kim | G06F 21/6209 |
| | | | 713/190 |
| 2014/0281495 A1* | 9/2014 | Um | G06F 21/44 |
| | | | 713/155 |
| 2014/0344877 A1* | 11/2014 | Ohmata | H04H 60/14 |
| | | | 725/110 |
| 2014/0344899 A1* | 11/2014 | Kwon | G06F 21/62 |
| | | | 726/4 |
| 2015/0113272 A1* | 4/2015 | Han | G06F 21/00 |
| | | | 713/168 |
| 2015/0256537 A1* | 9/2015 | Chew | G06F 21/30 |
| | | | 726/7 |

\* cited by examiner

STORAGE MODULE, HOST, AND METHOD FOR SECURING DATA WITH APPLICATION INFORMATION

PRIORITY

This application claims priority to India Patent Application No. 5266/CHE/2014, filed on Oct. 21, 2014, entitled "Storage Module, Host, and Method for Securing Data with Application Information," the entire disclosure of which is hereby incorporated by reference.

BACKGROUND

Storage modules, such as removable memory cards and USB devices, are often connected to a host so that an application on the host can store data in the storage module. A user can then remove the storage module from that host and connect it to another host, so an application on that other host can read the data. To prevent the data from being accessed by an unauthorized entity, the host can encrypt the data before the data is sent to the storage module for storage. That way, if an unauthorized entity somehow gains access to the data, the unauthorized entity will not be able to read the data since it is encrypted. Instead of the host encrypting the data, the storage module can encrypt the data. Also, the storage module can store encrypted or unencrypted data in a secure (private) memory area that can only be accessed by an entity that authenticates to the storage module.

OVERVIEW

Embodiments of the present invention are defined by the claims, and nothing in this section should be taken as a limitation on those claims.

By way of introduction, the below embodiments relate to a storage module, host, and method for securing data with application information. In one embodiment, a storage module is provided comprising a memory and a controller. The controller is configured to store data and information about an application that generated the data and allow the data to be read only if information about an application attempting to read the data matches the information about the application that generated the data.

In another embodiment, a method is provided in which a storage module obtains data and an application identifier of an application that generated the data. The storage module tags the data with the application identifier and stores the tagged data in the memory. The stored data can be read from the memory only if an application attempting to read the data has an application identifier that matches the application identifier with which the data was tagged.

In yet another embodiment, a host device is provided comprising a memory configured to store a user application and a security application and a controller configured to execute the user application and the security application. When executed by the controller, the user application is configured to generate data and send the data to a storage module for storage, and the security application is configured to receive an application identifier of the application and send the application identifier to the storage module to associate the application identifier with the data from the application.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

As mentioned above, storage modules are often used to transfer data from one host to another. A problem can occur if the data contains a virus or other malware, and the virus would be passed from host to host. While the prior security approaches discussed above prevent an unauthorized entity from reading stored data, they do not prevent the spread of a virus among authorized entities. The following embodiments can be used to address this problem. Before turning to these and other embodiments, the following paragraphs provide a discussion of exemplary storage modules that can be used with these embodiments. Of course, these are just examples, and other suitable types of storage modules can be used.

Figure 1A:
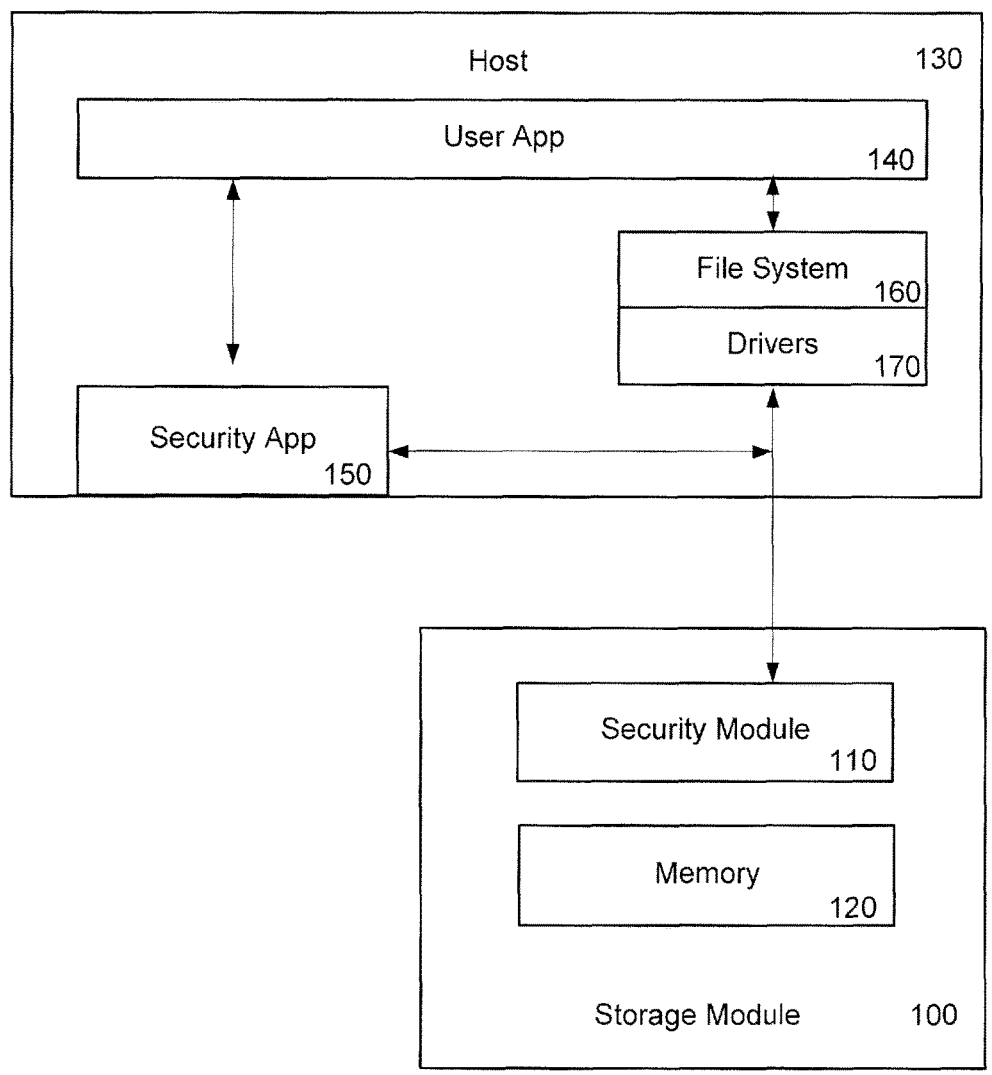
FIG. 1A is a block diagram of a storage module of an embodiment removably connected to a host, where the storage module and host are separable, removable devices.

FIG. 1A shows a storage module 100 operatively in communication with a host 130. As used herein, the phrase "operatively in communication with" could mean directly in communication with or indirectly in (wired or wireless) communication with through one or more components, which may or may not be shown or described herein. The storage module 100 can take any suitable form, such as, but not limited to, a handheld, removable memory device, such as a Secure Digital (SD) memory card, a microSD memory card, a Compact Flash (CF) memory card, a universal serial bus (USB) device (with a USB interface to the host), or a solid-state drive (SSD). The host can also take any suitable form, such as, but not limited to, a mobile phone, a tablet, a digital media player, a game device, a personal digital assistant (PDA), a mobile (e.g., notebook, laptop) personal computer (PC), or a book reader. The storage module 100 and the host 130 can have respective interfaces for placing themselves in communication with one another.

Figure 1B:
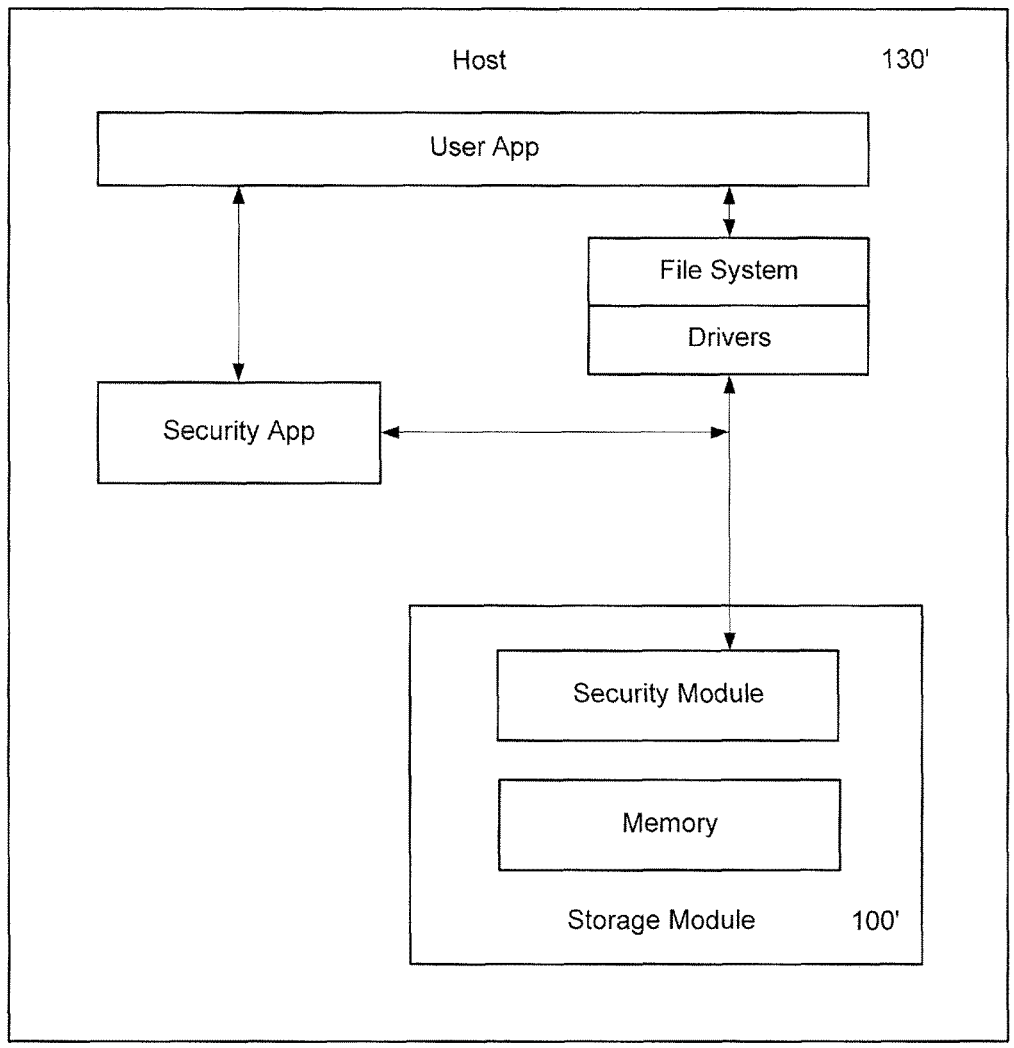
FIG. 1B is a block diagram of a host of an embodiment, where a storage module is embedded in the host.

In the implementation shown in FIG. 1A, the storage module 100 is removably connected to the host 130. The storage module 100 and host 130 have mating physical and electrical connectors that allow the storage module 100 and host 130 to be removably connected to each other. Alternatively, the storage module 100 and host 130 can have transmitters/receivers that allow the storage module 100 and host 130 to wireless communicate with one another. In this implementation, the storage module 100 and host 130 are separable, removable devices. Alternatively, as shown in FIG. 1B, the storage module 100' can be embedded in the host 130'. In this implementation, a host controller can control the storage module 100', and the storage module 100' can have its own controller to control its internal memory operations. Also, in general, a host controller can be any controller capable of interfacing with the storage module 100', be it a controller in monolithic form, an entire controller, or a separate functionality module. In this embedded embodiment, the storage module 100' can take the form of an iNAND™ eSD/eMMC embedded flash drive by SanDisk Corporation, or, more generally, any type of solid state drive (SSD) (e.g., an enterprise solid-state storage device), a hybrid storage device (having both a hard disk drive and a solid state drive), and a memory caching system. The storage module 100' and the host 130' can interface with one another using, for example, an eMMC interface, a UFS interface, an NVMe interface, a SAS interface, and a SATA interface. Other interfaces can be used.

Returning to FIG. 1A, a storage module 100 of one embodiment comprises a security module 110 and a memory 120. The security module 110 can be a hardware component in the storage module 100 (e.g., a hardware component in the storage module's controller). Alternatively, some or all of the functionality of the security module 110 can be implemented as software or firmware (e.g., executed by the storage module's controller). The storage module's controller can take any suitable form, such as, but not limited to, a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Exemplary functions of the security module 110 are discussed below, and the controller can be configured with hardware and/or software to perform these (and other) functions, such as the acts shown in the attached flow charts.

The memory 120 can take any suitable font, such as, for example, solid-state (e.g., flash) NAND memory, bit cost scaling (BiCs) memory, and resistive random-access memory (Re-RAM). The memory 120 can be implemented in one or multiple memory dies and can be a two-dimensional memory or a three-dimensional memory. Also, the memory 120 can be one-time programmable, few-time programmable, or many-time programmable and can use single-level cell (SLC) or multiple-level (e.g., two or more) cell (MLC) technologies. Additional example implementations of a memory are provided at the end of the detailed description.

Figure 2:
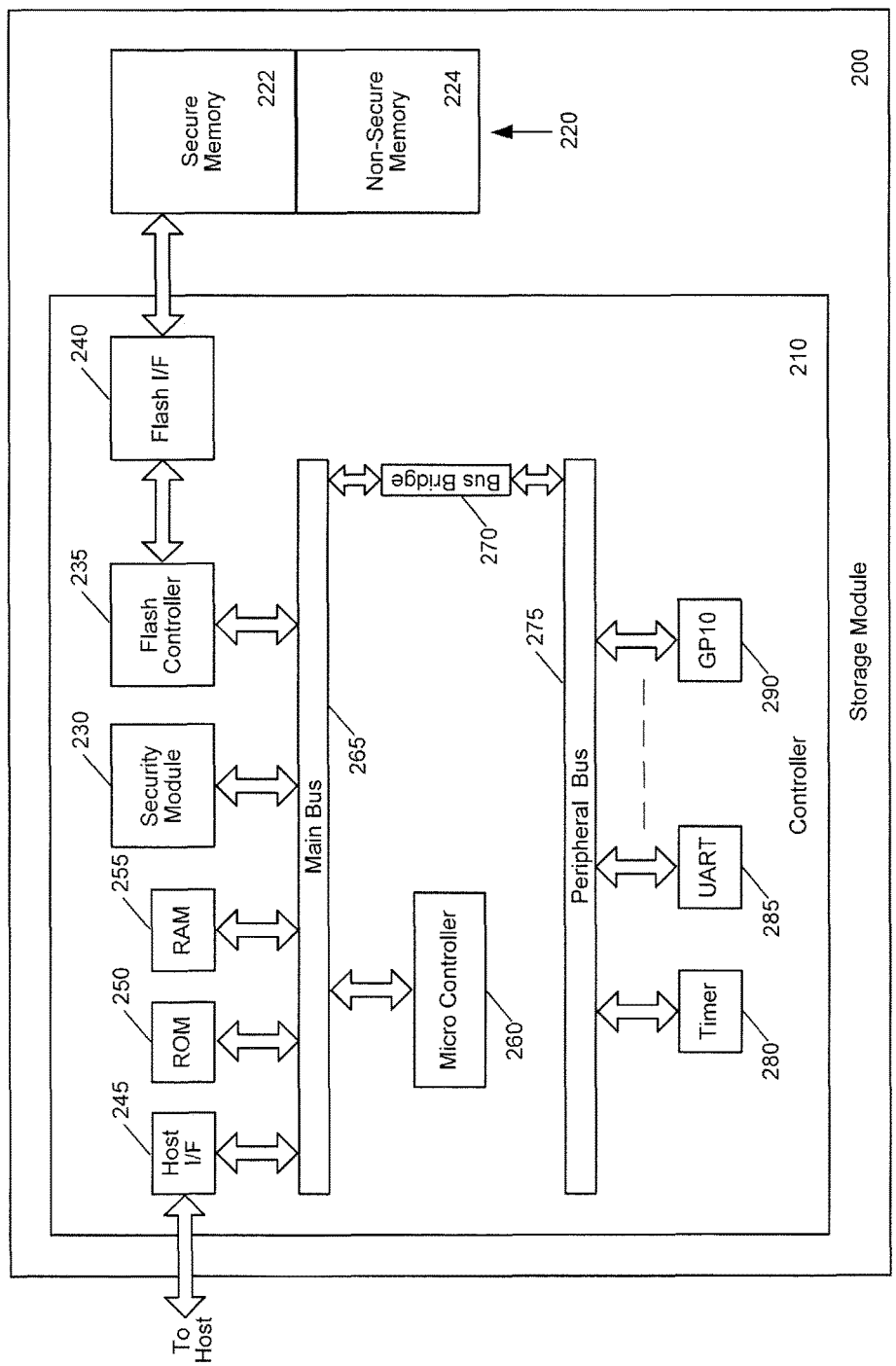
FIG. 2 is a block diagram of a storage module of an embodiment.

FIG. 2 is a more detailed illustration of one particular implementation of a storage module 200. It should be understood that other implementations are possible. As shown in FIG. 2, the storage module 200 in this embodiment comprises a controller 210 and a memory 220 having secure 222 and non-secure 224 portions (e.g., partitions or separate memory units). The controller 210 comprises a security module 230, a flash controller 235, a flash interface 240, a host interface 245, ROM 250, RAM 255, and a microcontroller 260 all connected to a main bus 265, which connects to a peripheral bus 275 via a bus bridge 270. The peripheral bus 275 is connected to a timer 280, a Universal Asynchronous Receiver/Transmitter (UART) 285, and a general-purpose IO (GPIO) module.

In operation, the micro controller 260 (e.g., a CPU) controls the general operation of the storage module 200. The micro controller 260 read boot-up and other instructions from the ROM 250 and uses the RAM 255 to store instructions and data used in operating the storage module 200 (such as an operating system). The storage module 200 receives data from a host via the host interface 245 and uses the flash controller 235 to store data in the memory 220 via the flash interface 240. For example, the flash controller 235 can generate specific instructions to the memory 220 to store data according to its knowledge of the memory geometry, timing parameters, and required write sequences. The non-secure memory area 224 is a public area that can be openly read by a host, whereas the secure memory area 222 is a private area that is only accessible by the storage module 200 and is not visible to a host. The timer 280, UART 285, and GPIO 290 are used in the general operation of the storage module 200 to communicate with the various components. The functions of the security module 230 are described in detail below.

Turning now to the host, FIG. 1A shows that the host 130 in one embodiment contains a user application 140, a security application 150, a file system 160, and drivers 170. The user application 140 is any application that can generate data for storage in the storage module 100, such as, but not limited to, a media player, a game player, and a banking application. The data generated by an application for storage in the storage module 100 can take any suitable form, such as, but not limited to, the last play location of a movie or song before it was paused, the last play location in a game before it was saved, banking transaction information (e.g., a receipt of a fund transfer, tax information, etc.), and a user's PIN or password. The file system 160 (e.g., a FAT file system or an EXT (extended file system) file system) takes the data generated by the user application 140 and puts it into a file format, and the drivers 170 generate machine language code to write the file in the storage module 100. The functions of the security application 150 will be discussed in detail below.

Figure 3:
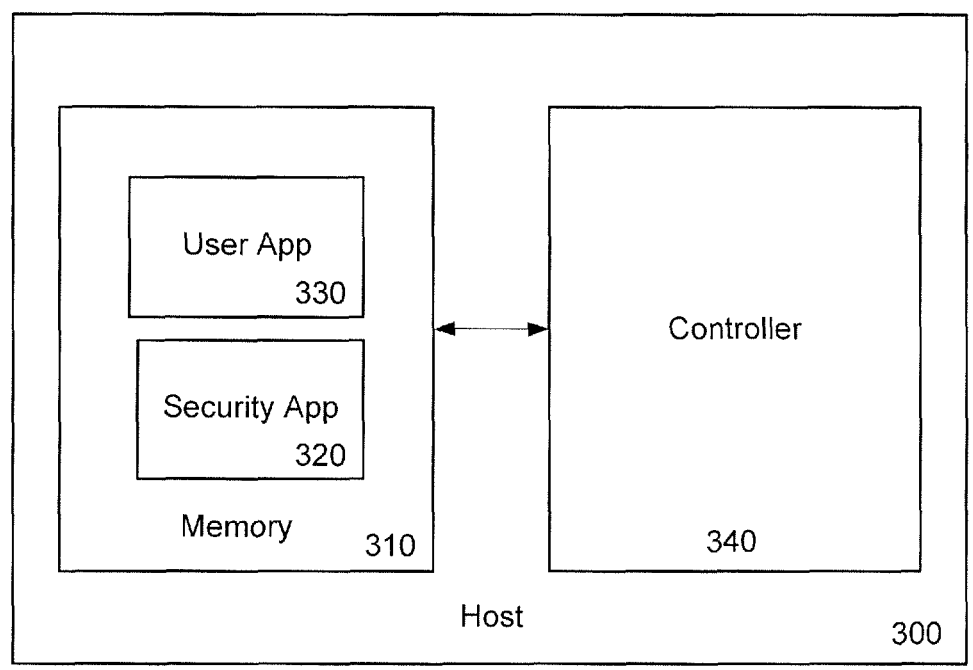
FIG. 3 is a block diagram of a host of an embodiment.

FIG. 3 is a more detailed illustration of one particular implementation of a host 300. It should be understood that other implementations are possible. As shown in FIG. 3, the host 300 contains a controller 340 and a memory 310 which stores computer-readable program code/instructions for a user application 330 and security application 320, which are executed by the controller 340. Alternatively, one or more of these applications 320, 330 can be implemented in hardware.

As mentioned above in conjunction with FIG. 1A, the storage module 100 has a security module 110 and the host 130 has a security application 150. The security module 110 and security application 150 work together to make sure that data written by an application on one host can only be read by the same type of application on another host. Consider, for example, the situation in which a particular banking application (e.g., an app from Acme Bank) on one host (e.g., a user's work computer) saves banking transaction data to the storage module 100. With these embodiments, when the storage module 100 is used with another host (e.g., the user's home computer), the saved banking transaction data can only be accessed by the same banking application (e.g., an app from Acme Bank) on that other host and not by other applications running on the other host. By restricting which applications can read the data, not only is the data more secure, but the restriction also protects the spread of viruses and other malware by reducing the number of applications that can possibly read the data and infect the host.

Figure 4:
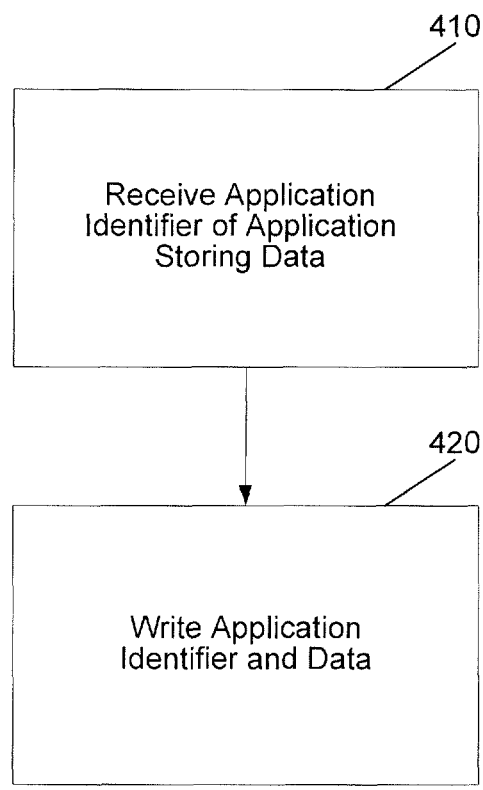
FIG. 4 is a flow chart of a method of an embodiment for securing data with application information.

In general, as shown in FIG. 4, the security module 110 receives data and information about the application that generated the data (e.g., an application identifier of the user application 140) (act 410) and stores the data and application identifier in the memory 120 (act 420). (If the application fails to provide its identifier, the security module 150 can treat the data as unsecure data and store it in an unsecure manner, as usual.) The security module 110 is configured to allow the data to be read from the memory 120 only if information about an application attempting to read the data (e.g., the banking app on the user's home computer) matches the information about the application that generated the data (e.g., the banking app on the user's work computer).

The information about the application that generated the data can take any suitable form, such as an application identifier that identifies the application, although any other information can be used. Examples of an application identifier can include, but are not limited to, a serial number, version number, and model number of the application. It should be noted that an application identifier is not necessarily unique to one particular application but rather to a class of applications. For example, the same application identifier can be used for all of Acme Bank apps, so that any Acme Bank app can access the data. That is, the application identifier for each instantiation of the Acme Bank app can be the same (i.e., the application identifier for the Acme Bank app on the user's work computer can be the same as the application identifier for the Acme Bank app on the user's home computer). However, in an alternate embodiment, the application identifier for each instantiation of the Acme Bank app is different (so only the Acme Bank app on the user's work computer (and not the Acme Bank app on the user's home computer) can access data written by the Acme Bank app on the user's work computer).

The application identifier can be provided to the storage module 100 in any suitable way. (For simplicity, "application identifier" will be used for the remainder of this discussion, although it should be understood that any information about the application that generated the data can be used.) For example, in one embodiment, the user application 140 is configured to provide the application identifier with the generated data as part of its normal operation. However, as user applications may be written by different parties who are not aware of the need for sending the application identifier and to retrofit these embodiments for existing environments, a security application 150 can be provided to the host 130 to query the user application 140 for the application identifier and then provides the information about the user application 140 to the storage module 100. For example, as shown in FIG. 1A, the security application 150 can append the application identifier to the packet of information leaving the drivers 170 for the storage module 100. Alternatively, the security application 150 can communicate the application identifier the file system 160 or another component in the host 130. The security application 150 can be downloaded to the host 130, or the storage module 100 can provide the security application 150 to the host (e.g., when the storage module 100 is connected to the host 130 for the first time).

Figure 5:
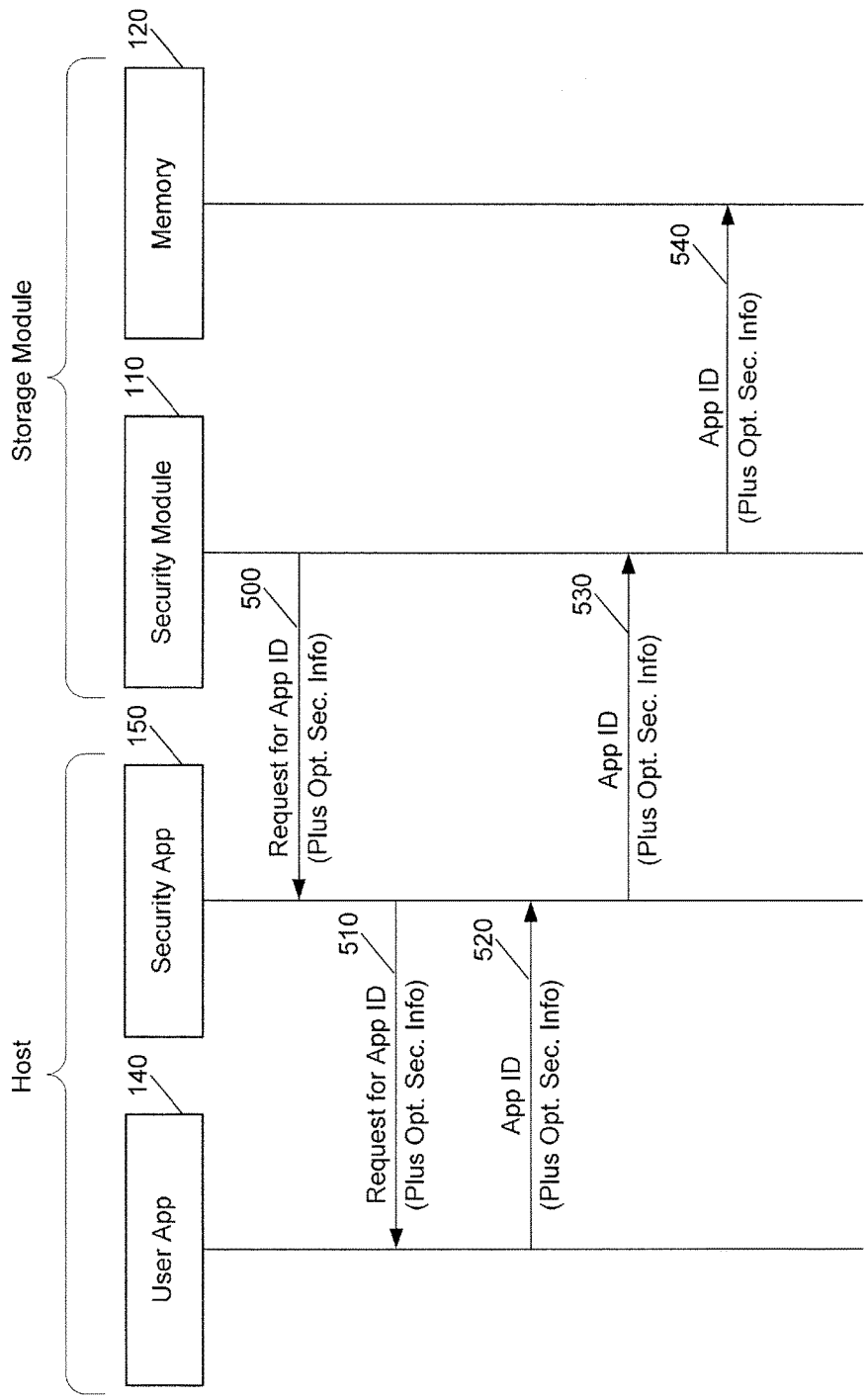
FIG. 5 is a timing diagram of an embodiment for securing data with application information.

The security application 150 can query the user application 140 for the application identifier on its own or in response from a request from the storage module 100. FIG. 5 is a timing diagram that shows how the security application 150 can query the user application 140 for the application identifier in response from a request from the storage module 100. As shown in FIG. 5, the security module 110 on the storage module 100 sends a request for the application identifier (and optional other security information, which will be discussed below) to the security application 150 on the host 130 (act 500). The security application 150 then queries the user application 140 for the information (act 510) and gets a response (act 520). The security application 150 then provides the information to the security module 110 (act 530), which then stores the application identifier with the data in the memory 120 (act 540).

When the storage module 100 receives the application identifier, the storage module 100 stores the identifier in such a way that it is associated with the data. For example, in one embodiment, the storage module 100 stores the application identifier as part of the data (e.g., the storage module 100 tags that data with the application identifier by storing the application identifier in the header or some other location in the data itself). Alternatively, the application identifier can be stored in a table or in some other format separate from the data.

The security application 150 also provides the application identifier to the storage module 100 when an application is attempting to read data stored in the storage module 100. The security module 110 in the storage module 100 compares the application identifier of the application attempting to read the data with the application identifier stored in/with the data. The storage module 100 allows the data to be read only if the application identifiers match. As mentioned above, this secures the data and helps prevent the spread of viruses and other malware.

Figure 6:
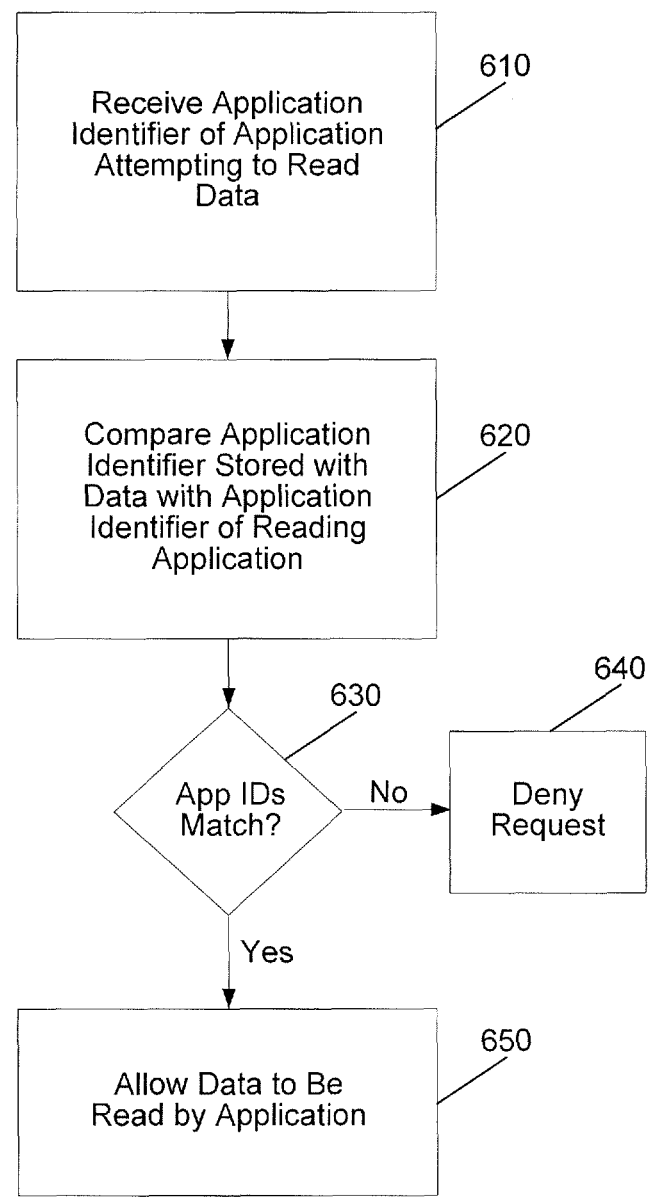
FIG. 6 is a flow chart of an embodiment for reading data secured with application information.

This reading process is shown in the flow chart in FIG. 6. As shown in FIG. 6, the security module 150 receives the application identifier of the application attempting to read the data (act 610). The security module 150 then compares the application identifier stored with the data with the application identifier of the reading application (act 620) to see if the application identifiers match (act 630). If the application identifiers do not match, the read request is denied (act 640). However, if the application identifiers do match, the security module 150 allows the data to be read by the application (act 650).

Additional security measures can be provided. For example, in addition to the application identifier, the host 130 can provide the storage module 100 with at least one additional identifier that also needs to be matched before the stored data can be read from the storage module 100. An example of an additional identifier is the source of the application (e.g., identification of the web site that the application was downloaded from to make sure the application isn't from a known hacker's site). This offers a second level of protection. Additionally, the security module 110 can encrypt the data stored in the storage module 100, so the data cannot be useful even if somehow hacked from the memory 120 of the storage module. In one embodiment, the security application on the host 130 communicates with the user application 140 to determine its preferred encryption parameters (e.g., what encryption algorithm to use, what level of encryption to use, etc.) and sends that information to the storage module 100 along with the application identifier. As yet another level of protection, the storage module 100 can store data from the user application 140 in a secure area of the memory 120 to make the data visible only to the storage module 100. The security application 150 on the host 130 can communicate this "secure area" request to the security module 110; otherwise, the data can be stored in a non-secure area of the memory 120.

Other alternatives are possible. For example, if the host app fails to provide an application identifier, the secure app on the host can generate the application identifier for that application and send it to storage media. Also, in addition to or instead of the examples listed above, the application identifier can be generated from the version number, the model, and/or the build time. Additionally, the host secure app can send three parameters (application id, indicator of secure or non-secure storage, and kind of encryption type to be used), and based on these parameters, data will be stored on the storage module. Further, the data stored on the storage media can always be tagged. If it is non-secure area data, then the data can be read by the host app as usual. But, for the secure data, it has to be matched properly.

There are several advantages associated with these embodiments. As mentioned above, in prior systems that lack application data security at the storage module level, application data is stored in the memory without proper authentication and can be read by any application. This is because prior systems did not contain a security mechanism built inside the storage module for application data, and application data security was only handled by the host's operating system. This allowed corrupt data or viruses stored inside a storage module to be easily transferred to another host, thereby spreading the corrupt data and viruses. With these embodiments, the application data is stored with proper authentication on the storage module and avoids the data being read by unauthorized applications. In this way, application data security is jointly handled by the host operating system and the storage module. In contrast, many prior security systems were host driven, in that the host partitioned the memory, managed the partition, encrypted the data, stored/exchanged the keys with the storage module, and knew the location of the secure data on the storage module. Again, with these prior systems, if the host got infected with a virus or malware, there was no way the data could be protected from malicious access.

These embodiments provide a paradigm shift in that security is managed by the storage module and not the host. As discussed above, these embodiments move the complexity of application data security from the host operating system to firmware/secure operating system in the storage module. This way, the storage module can also act as a secure storage module for application data and prevent any unwanted access to secure application data. By using a security module in the storage module (e.g., hardware in the controller running a secure light-weight operating system), the storage module can protect itself from threats, as the storage module will not allow storing data without a proper application identifier and also will not allow data to be read without first authenticating the application identifier of the reading application. This can be especially useful for today's mobile systems, many of which lack security hardware and are not suitable for secure transaction. With these embodiments, the storage module is provided with a data storage security using system that can secure data against an attack.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional exemplary structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A memory device comprising:
a memory; and
a controller in communication with the memory, wherein the controller is configured to:
obtain data and information about an application that generated the data;
tag the data with the information;
store the data tagged with the information in the memory; and
allow the data to be read from the memory only if information about an application attempting to read the data matches the information that the data was tagged with;
wherein the application that generated the data runs on a host in communication with the memory device, wherein the host comprises a security application that queries the application for the information and provides the information to the memory device, and wherein the security application is provided to the host by the memory device.

2. The memory device of claim 1, wherein the controller is further configured to encrypt the data before storing the data in the memory.

3. The memory device of claim 1, wherein the controller is further configured to store the data in a secure area of the memory.

4. The memory device of claim 1, wherein the controller is further configured to store the data in a non-secure area of the memory.

5. The memory device of claim 1, wherein the information about the application that generated the data is stored as part of the data.

6. The memory device of claim 1, wherein the security application queries the application for the information in response to a request from the controller.

7. The memory device of claim 1, wherein the memory is a three-dimensional memory.

8. The memory device of claim 1, wherein the memory device is removably connected to the host.

9. The memory device of claim 1, wherein the memory device is embedded in the host.

10. A method for securing data, the method comprising:
performing the following in a memory device comprising a memory:
obtaining data and an application identifier of an application that generated the data;
tagging the data with the application identifier; and
storing the data tagged with the application identifier in the memory;
wherein the stored data can be read from the memory only if an application attempting to read the data has an application identifier that matches the application identifier that the data was tagged with;
wherein the application that generated the data is running on a host in communication with the memory device, wherein the host comprises a security application that queries the application for the application identifier and provides the application identifier to the memory device, and wherein the security application is provided to the host by the memory device.

11. The method of claim 10 further comprising:
receiving encryption parameters; and
encrypting the data tagged with the application identifier according to the encryption parameters before storing the data in the memory.

12. The method of claim 10, wherein the data is stored in a secure area of the memory.

13. The method of claim 10, wherein the data is stored in a non-secure area of the memory.

14. The method of claim 10, wherein tagging the data with the application identifier comprises storing the application identifier in a header of the data.

15. The method of claim 10, further comprising tagging the data with at least one additional identifier that also needs to be matched before the stored data can be read from the memory.

16. The method of claim 15, wherein the at least one additional identifier comprises an identification of a source of the application.

17. The method of claim 10, wherein the security application queries the application for the application identifier in response to a request from the memory device.

18. The method of claim 10, wherein the memory is a three-dimensional memory.

19. The method of claim 10, wherein the memory device is removably connected to the host.

20. The method of claim 10, wherein the memory device is embedded in the host.

21. A host device comprising:
a memory configured to store a user application and a security application; and
a controller in communication with the memory and configured to execute the user application and the security application
wherein the user application, when executed by the controller, is configured to generate data; and send the data to a memory device in communication with the host device for storage;
wherein the security application, when executed by the controller, is configured to: receive an application identifier of the user application; and send the application identifier to the memory device to associate the application identifier with the data from the user application; wherein the security application is provided to the host device by the memory device; and wherein the stored data can be read from the memory device only if an application attempting to read the data has an application identifier that matches the application identifier associated with the data.

22. The host device of claim 21, wherein the security application is further configured to provide the memory device with encryption parameters to be used by the memory device to encrypt the data before storing the data.

23. The host device of claim 21, wherein the security application is further configured to: receive at least one additional identifier of the user application and provide the at least one additional identifier to the memory device.

24. The host device of claim 23, wherein the at least one additional identifier comprises an identification of a source of the user application. application and provide the at least one additional identifier to the memory device.

25. The host device of claim 21, wherein the security application is further to query the user application for the application identifier in response to a request from the memory device.

26. The host device of claim 21 wherein the memory device comprises a three-dimensional memory.

27. The host device of claim 21, wherein the memory device is removably connected to the host device.

28. The host device of claim 21, wherein the memory device is embedded in the host device.

* * * * *

UNITED STATES PATENT AND TRADEMARK OFFICE
CERTIFICATE OF CORRECTION

PATENT NO. : 9,626,304 B2
APPLICATION NO. : 14/560670
DATED : April 18, 2017
INVENTOR(S) : Sharma et al.

Page 1 of 1

It is certified that error appears in the above-identified patent and that said Letters Patent is hereby corrected as shown below:

In the Claims

In Column 11, Claim 21, Line 22, immediately after "security application" insert --;--.

In Column 11, Claim 21, Line 24, immediately after "is configured to" insert --:--.

In Column 12, Claim 23, Line 14, immediately after "the user application" insert --;--.

In Column 12, Claim 24, Line 18, after "of the user application." delete "application and provide the at least one additional identifier to the memory device.".

In Column 12, Claim 25, Line 21, after "application is further" insert --configured--.

Signed and Sealed this
Seventeenth Day of April, 2018

Andrei Iancu
*Director of the United States Patent and Trademark Office*